(12) United States Patent
Preisner et al.

(10) Patent No.: US 8,577,572 B2
(45) Date of Patent: Nov. 5, 2013

(54) METHOD AND DEVICE FOR ADAPTING THE CONTROL OF THE CLUTCHES OF A DOUBLE CLUTCH TRANSMISSION

(75) Inventors: Marian Preisner, Buehl (DE); Juergen Benz, Oberkirch (DE); Reinhard Berger, Jena (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 552 days.

(21) Appl. No.: 12/288,870

(22) Filed: Oct. 24, 2008

(65) Prior Publication Data

US 2009/0069992 A1 Mar. 12, 2009

Related U.S. Application Data

(63) Continuation of application No. PCT/DE2007/000594, filed on Apr. 2, 2007.

(30) Foreign Application Priority Data

Apr. 28, 2006 (DE) .......................... 10 2006 019 772

(51) Int. Cl.
*B60W 10/02* (2006.01)
*G06F 17/00* (2006.01)

(52) U.S. Cl.
USPC ............... 701/68; 701/67; 477/174; 477/176; 477/180

(58) Field of Classification Search
USPC .......... 701/67, 68, 51, 58; 477/176, 109, 166, 477/174, 180
See application file for complete search history.

(56) References Cited

U.S. PATENT DOCUMENTS

| | | | |
|---|---|---|---|
| 5,795,265 A * | 8/1998 | Domian et al. | 477/143 |
| 5,890,392 A | 4/1999 | Ludanek et al. | |
| 5,950,781 A * | 9/1999 | Adamis et al. | 192/3.61 |
| 6,386,351 B1 * | 5/2002 | Salecker et al. | 192/54.1 |
| 6,471,022 B1 * | 10/2002 | Goebel et al. | 192/3.58 |
| 6,832,978 B2 * | 12/2004 | Buchanan et al. | 477/174 |
| 2004/0064232 A1 * | 4/2004 | Eich et al. | 701/68 |
| 2004/0157704 A1 * | 8/2004 | Stork et al. | 477/166 |
| 2004/0166992 A1 * | 8/2004 | Buchanan et al. | 477/181 |
| 2004/0255654 A1 * | 12/2004 | Bulgrien et al. | 73/118.1 |
| 2005/0037893 A1 * | 2/2005 | Siebigteroth et al. | 477/176 |
| 2005/0064987 A1 * | 3/2005 | Budal et al. | 477/3 |
| 2005/0071065 A1 * | 3/2005 | Zimmermann et al. | 701/51 |
| 2005/0107936 A1 * | 5/2005 | Keyse et al. | 701/58 |
| 2006/0135316 A1 * | 6/2006 | Fujii et al. | 477/156 |
| 2006/0154786 A1 * | 7/2006 | Fahland et al. | 477/174 |

FOREIGN PATENT DOCUMENTS

| | | |
|---|---|---|
| DE | 19631983 C1 | 2/1998 |
| DE | 10308713 A1 | 10/2003 |
| WO | WO 03/074908 A3 | 9/2003 |

* cited by examiner

*Primary Examiner* — Christine Behncke
(74) *Attorney, Agent, or Firm* — Simpson & Simpson, PLLC

(57) ABSTRACT

A method of adapting control of clutches of a double clutch transmission, including: during a shifting process, controlling torque transmittable by an opening clutch and torque transmittable by a closing clutch according to nominal curves; during a shifting process, determining a difference between a nominal value and an actual value; and adapting a nominal curve of at least one of the clutches for a following shifting process by reducing a difference between the nominal value and the actual value.

9 Claims, 6 Drawing Sheets

METHOD AND DEVICE FOR ADAPTING THE CONTROL OF THE CLUTCHES OF A DOUBLE CLUTCH TRANSMISSION

CROSS REFERENCE TO RELATED APPLICATIONS

This application is filed under 35 U.S.C. §120 and §365(c) as a continuation of International Patent Application PCT/DE2007/000594, filed Apr. 2, 2007, which application claims priority from German Patent Application No. 10 2006 019 772.0, filed Apr. 28, 2006, which applications are incorporated herein by reference in their entirety.

FIELD OF THE INVENTION

The invention relates to a method of and a device for adapting the control of the clutches of a double clutch transmission.

BACKGROUND OF THE INVENTION

A double clutch or parallel transmission facilitates change of transmission ratio without interruption of traction force whilst retaining good efficiency of conventional mechanical transmission. FIG. 8 shows schematically the design of such a prior art double clutch transmission:

A drive shaft 12 driven by an engine 10, for instance, an internal combustion engine, is connected via a clutch K1 with a first split transmission unit 14 and via a clutch K2 with a second split transmission unit 16 of a double clutch transmission formed by the clutches and split transmission units. The split transmission units 14 and 16 outputs act on a common shaft 18 that drives the wheels of a motor vehicle via a differential unit 20. The split transmission unit 14, for instance, contains odd-numbered gears of the double clutch transmission; the split transmission unit 16 contains even-numbered gears of the double clutch transmission. To control the clutches K1 and K2 and engage the gears in the split transmission units 14 and 16 an electronic control device 22 provided. Outputs of the control device are connected with actuators for the clutches and the split transmission units and their inputs are connected with sensors or other control devices of the vehicle, which receive the signals relevant for the control of the clutches and for engaging or disengaging the gears in the split transmission unit.

Design and function of such double clutch or parallel transmission are actually known and are therefore not explained in detail.

BRIEF SUMMARY OF THE INVENTION

FIG. 9 for instance shows a shifting process, wherein the time is depicted on the abscissa and the torque on the ordinate. The dotted line depicts the torque available on the drive shaft 12 as desired by driver $M_{FW}$, for instance, and set by means of the accelerator. The dashed line shows the clutch torque $M_{K1}$ transmittable via the clutch K1. The continuous line shows the clutch torque $M_{K2}$ transmittable via the clutch K2.

It is assumed in the depicted case that the vehicle in question is running in third gear, which is engaged in the split transmission unit 14 and that clutch K1 is closed. In the split transmission unit 16, the forth gear is engaged and clutch K2 open. When at time point $T_0$ a shifting process is triggered from the third gear into the forth gear, clutch K1 is opened by the control device 22 and clutch K2 closed. At time point $T_2$ the shifting process ends, i.e. the vehicle is running in the forth gear with torque transmission via the clutch K2. The clutch K1 is opened so that in the split transmission unit 14 a different gear can be pre-selected or engaged. The clutches are opened and closed between the time points $T_0$ and $T_1$, essentially linearly. The torque is transmittable from the clutch K2 at the end of the shifting process, under the assumption that the engine torque present at time point $T_1$ can be equal to the engine torque before the shifting process, or as depicted can be adapted to the varying engine torque during shifting process or be adapted to the torque desired by a driver. The gradient with which the clutch K2 is closed can change during a shifting process. After time point $T_1$ at which the clutch K1 is fully open and the clutch K2 is closed so that a predetermined clutch torque can be transmitted, the slip of the clutch K2 is recorded and the clutch K2 further controlled such that driving is continued with a predetermined slip or the slip gradually reduces to zero. The period between $T_0$ and $T_1$, for instance, is only between 0.1 and 0.4 seconds, so that very rapid gearshifts are possible without interruption of traction force. The change of engine torque or of the torque desired by driver occurring between $T_0$ and $T_1$ is therefore generally small. Since during the overlapping shifting (period between $T_0$ and $T_1$) vehicle speed hardly changes, the rotational speed change of the engine should be small, so that at the time point $T_0$ the present slip between the input shaft of the split transmission unit and the crankshaft of the engine can remain constant up to time point $T_1$.

In practice, problems occur when shifting double clutch transmission gears; and the problems can have disadvantageous influence. For instance, the torque transmittable from both clutches at the respective time point can cave in due to the interaction between clutch activations or other influences or may increase in unforeseen manner, so that it does not correspond with the depicted and controlled nominal torque, in which the dotted curve is somehow approximately equal to the overall curve comprising the dashed and the continuous curves. This can lead to undesired run-up of the engine during a shifting process or may lead to undesired rotational speed reduction that leads to further problems due to dynamic effects. Moreover, the engine can run up in undesired manner when the attained transmittable torque of the clutch K2 at the time point $T_2$ is too low.

The object of the invention is to provide measures to solve aforementioned problems.

This object is met by a method of adapting the control of the clutches of a double clutch transmission, so that during a shifting process the transmittable torque form the opening clutch and the transmittable torque from the closing clutch are controlled, based on nominal curves. During shifting, a difference between a nominal value and an actual value is determined and the nominal curve of at least one of the clutches is adapted for a subsequent shifting process, for example, by reducing the difference between the nominal value and actual value.

For instance, the difference between the transmittable nominal overall clutch torque and the actual overall torque can be determined during a shifting process. The actual overall torque, for instance, is equal to the overall value of the static and dynamic engine torque fed into the transmission by an engine.

The static engine torque can be equal to the torque input by an accelerator as desired by driver.

During shifting, the slip of the opening clutch is advantageously compared with a nominal slip and the nominal torque of the closing clutch is increased proportionally with the increase of slip.

In one embodiment of the method according to the invention, the nominal curve of the closing clutch is adapted correspondingly with deviation of slip of the opening clutch at the end of overlapping shifting.

The nominal curve of the closing clutch, for instance, can be corrected by a factor that depends on the torque desired by driver as input by means of an accelerator and the slip at the end of overlapping shifting.

The present invention also includes a system for adapting the control of clutches of double clutch transmission. The system includes an actuator for each one of the clutches and an electronic control device for controlling the opening of one of the clutches and at the same time for closing the other clutch during the overlapping phase. The control device is suitable for controlling the clutches according to one of the aforementioned methods.

BRIEF DESCRIPTION OF THE DRAWINGS

The nature and mode of operation of the present invention will now be more fully described in the following detailed description of the invention taken with the accompanying drawing figures, in which:

FIG. 1 depicts torque curves for pulling upshift according to the present invention, for instance, from first gear to second gear or from second gear to third gear. $M_{sKg}$ depicts the torque transmittable by the opening clutch, which reduces linearly according to a program between $T_0$ and $T_1$ stored in the control device. $M_{sKk}$ depicts the torque transmittable by the closing clutch, as dashed line; said torque being stored in the control device.

$M_{s\Sigma K}$ designates the overall transmittable clutch torque that results from the overall of sum of $M_{sKg}$ and $M_{sKk}$.

The transmittable torque prior to the beginning of overlapping shifting from the opening clutch is advantageously set to a value that is slightly smaller than the present engine torque, so that the opening clutch at time point $T_0$ has a predetermined slip, which, during the overlapping shifting (up to time point $T_1$) remains advantageously essentially constant. As from the time point $T_1$, at which the closing clutch takes over the transmission of torque, the control of the closing clutch is switched over to slip control, so that the transmittable clutch torque is at first increased for the reduction of engine speed and then regulated to a value at which the new clutch transmits the engine torque essentially without slip.

Figure 1:
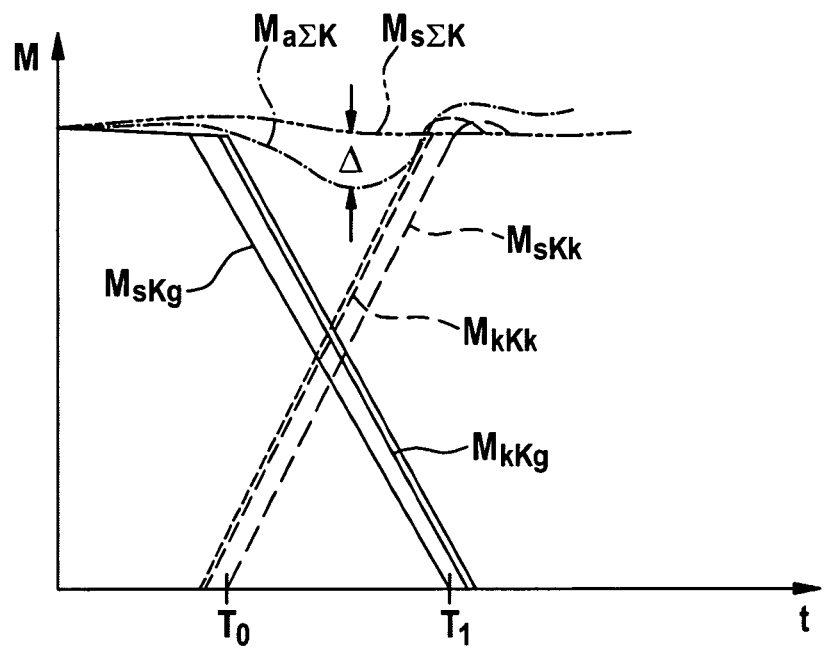
FIG. 1 shows characteristic curves of transmissible clutch torques.
Figure 2:
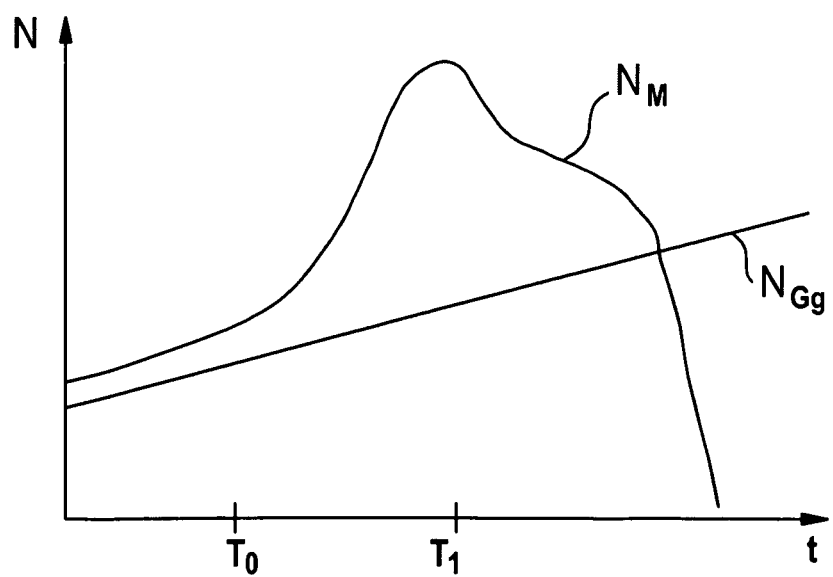
FIG. 2 shows an excessive rotational speed increase of an engine, resulting from the torque collapse of FIG. 1.
Figure 8:
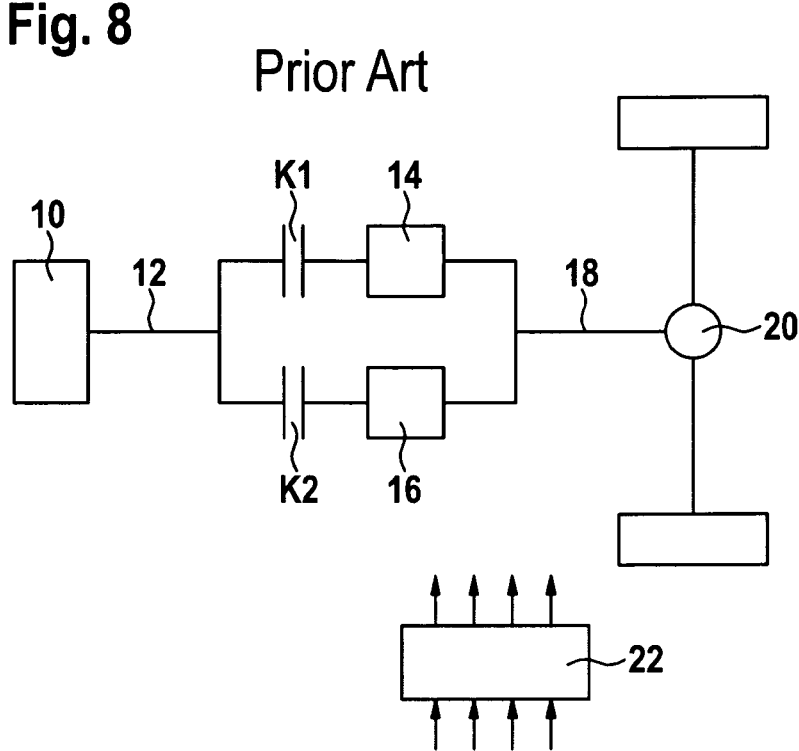
FIG. 8 shows a block diagram of a prior art double clutch transmission.
Figure 9:
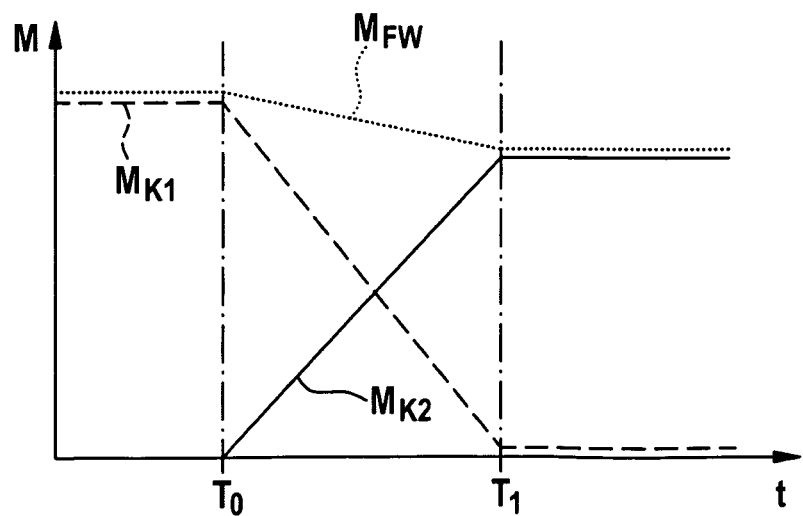
FIG. 9 shows a simplified schematic illustration of a prior art shifting process.

FIG. 2 shows an excessive rotational speed increase of an engine, resulting from the torque collapse of FIG. 1. In practice, it has emerged that the engine revs during the overlapping phase of actuating the clutch in accordance with the programmed curves $M_{sKg}$ and $M_{sKk}$ based on FIG. 2, in which the line designated with $n_M$ depicts the characteristic curve of engine speed versus the time t. $N_{Gg}$ depicts the rotational speed curve of the input shaft of the transmission assigned to the opening clutch. Referring to FIG. 8 as an example of a system to which the present invention method is applicable, the slip between the input shaft of the transmission and that of the drive shaft 12 driven by the engine 10 increases in unforeseen manner. This indicates that the current overall clutch torque being too low, as depicted in FIG. 1 with the dashed line $M_{a\Sigma K}$. The difference between nominal or programmed overall clutch torque and current overall clutch torque is designated with $\Delta$ in FIG. 1.

Figure 3:
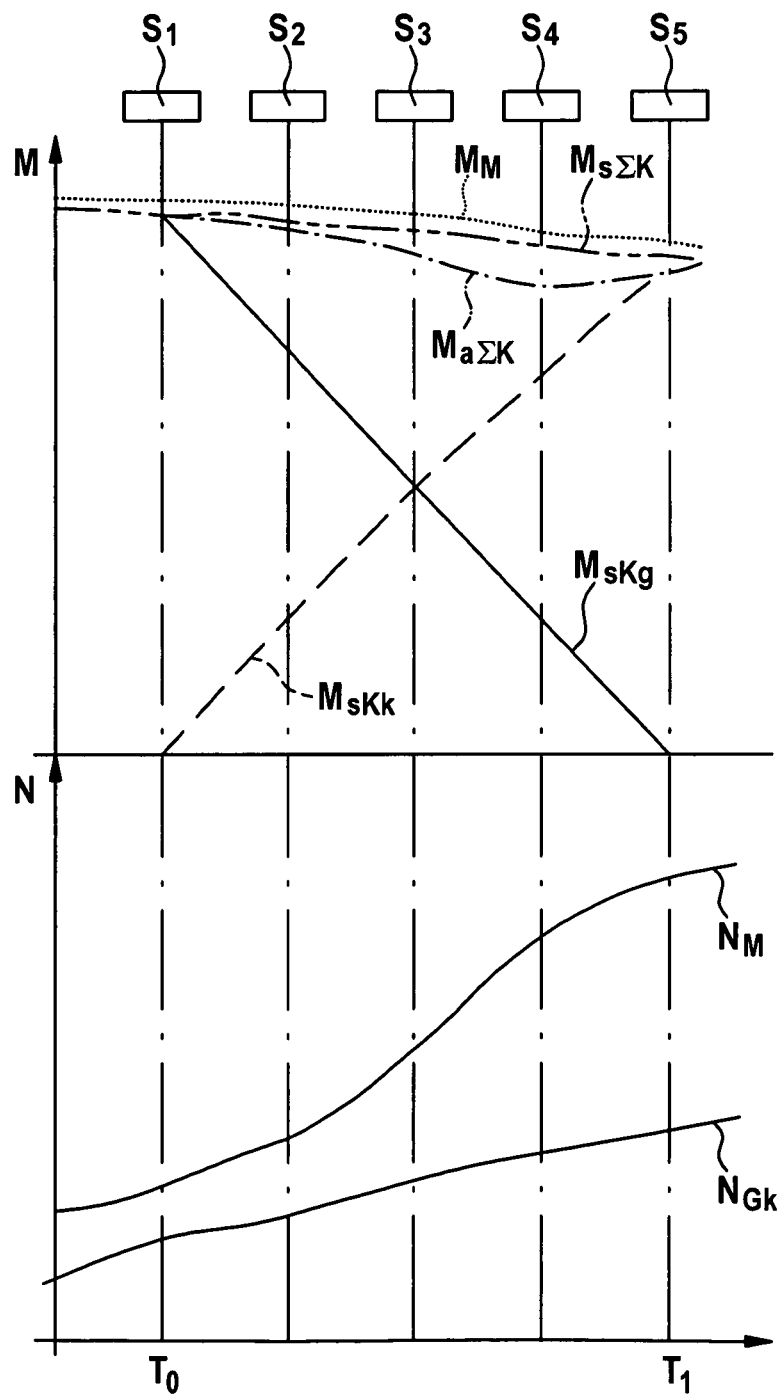
FIG. 3 shows torque and rotational speed curves according to a present invention method.

FIG. 3 shows torque and rotational speed curves according to a present invention method. The described phenomena of undesired excessive rotational speed increase or of engine revs, which is also associated with a certain measure of acceleration collapse, can be eliminated in the manner schematically depicted in FIG. 3.

The overlapping phase between $T_0$ and $T_1$ is subdivided in areas with control points S1 to S5. For example, each of these control points is assigned to a clutch defect $\Sigma Sn$ that is determined as follows:

a) At the control points, which correspond to predetermined time points during overlapping shifting, a clutch defect is determined based on slip rotational speeds measured at the control points. A rising slip between two control points $S_n$ and $S_{n+1}$ indicates that clutch torque is too low. This can be corrected, for example, in a following shifting process, the controlled clutch torque values are increased at this control point. Vice versa, reducing slip between two subsequent control points hints at clutch torque being too high, which, in a subsequent shifting process, can be corrected by reducing the controlled clutch torque at the respective time point.

b) A clutch defect can also be determined by comparison of the curve $M_{s\Sigma K}$ that represents the overall sum of controlled clutch torques with the actually, present, momentary instataneous overall clutch torque determined from engine parameters as follows: $M_{Mdyn}=M_M+I_M\times d\omega/dt$. $M_M$ is the static engine torque that is derived from stationary engine mapping and the position of its load actuator. $I_M\times d\omega/dt$ determines the dynamic component of engine torque, $I_M$ is the moment of inertia of the engine, and $d\omega/dt$ is its rotational speed change.

For example, the two variables $M_{s\Sigma K}$ and $M_{Mdyn}$ can be compared in two ways, namely:

a) Determining the percentage of error: $\Delta K=(M_{s\Sigma K}-M_{Mdyn})\times 100\%$; or b) Determining the percentage torque difference: $\Delta K=[(M_{s\Sigma K}-M_{Mdyn})/\text{basis}]\times 100\%$ In one example, an arbitrary fixed value can be introduced as "basis" or a variable reference quantity such as the torque desired by driver.

In both cases, a mean value of several measured values can be calculated.

In one embodiment, if overlapping shifting is provided with slipping clutches, slip between engine and input shaft of the opening clutch of the transmission is kept constant advantageously. To achieve this: $M_{s\Sigma K}=M_M-I_M\times d\omega_{ig}/dt$, where $\omega_{ig}$ is the rotational speed of the transmission input shaft on which the slip is kept constant. Depending on torque quality or based on active engine control generated by the electronic controller, it can be reasonable to use the torque desired by the driver that is input via an accelerator instead of the engine torque $M_M$.

In the case where the clutch control regulates the aforementioned overall clutch torque, then the overall clutch torque can be determined with the help of aforementioned formula. As a result, possibly occurring control inaccuracies such as dead-times of the actuators could also be adapted.

The error computed according to aforementioned, described methods is averaged over a certain period and assigned to the control points S1 to S5. At the same time, possible time displacement between error detection and time point of adjusting the nominal clutch torque that are present at the respective control point can be considered. Such a displacement can occur through signal filtering, signal averaging or dead times of the system. When all errors at the control points have been determined then the errors can be stored in error mapping, and be used during the next shifting process for adapting the of nominal clutch torque. The respective error can be stored depending on the clutch, since each clutch can feature a different error pattern.

The error between control points $S_1$ to $S_5$ is linearly interpolated. The stored error mapping is advantageously applied to only one of the two clutches during overlap phase and advantageously applied to the closing clutch in order to avoid instabilities. It is also possible to divide the error between both clutches. Adaptation is clarified in FIG. 1.

When the clutches are controlled in accordance with the lines $M_{sKg}$ and $M_{sKk}$ during a shifting process, at the same time, as explained, the depicted deviation between the stored overall clutch torque $M_{s\Sigma K}$ and the currently measured overall clutch torque $M_{a\Sigma K}$ is obtained. The correction of controlled clutch characteristics leads to corrected clutch characteristics $M_{kKg}$ or $M_{kKk}$ that is effective for the following shifting process in which the error designated with Δ is minimized. Both clutch characteristics are adapted in the depicted example. It is advantageous for determining the error to measure the slip on the opening clutch and to adapt the controlled clutch torque to the closing clutch.

Through adaptation, the rotational speed increase of the engine, visible in FIG. 2, is avoided. At time point $T_1$ the engine runs after adaptation at a rotational speed that is essentially only increased relative to the rotational speed at $T_0$ by the increment owing to vehicle speed increase and after $T_1$ it is reduced by means of the slip control of the clutch now transmitting the torque to a new nominal slip or, for slip-less operation, to the rotational speed of the transmission input shaft of the new split transmission unit.

Figure 4:
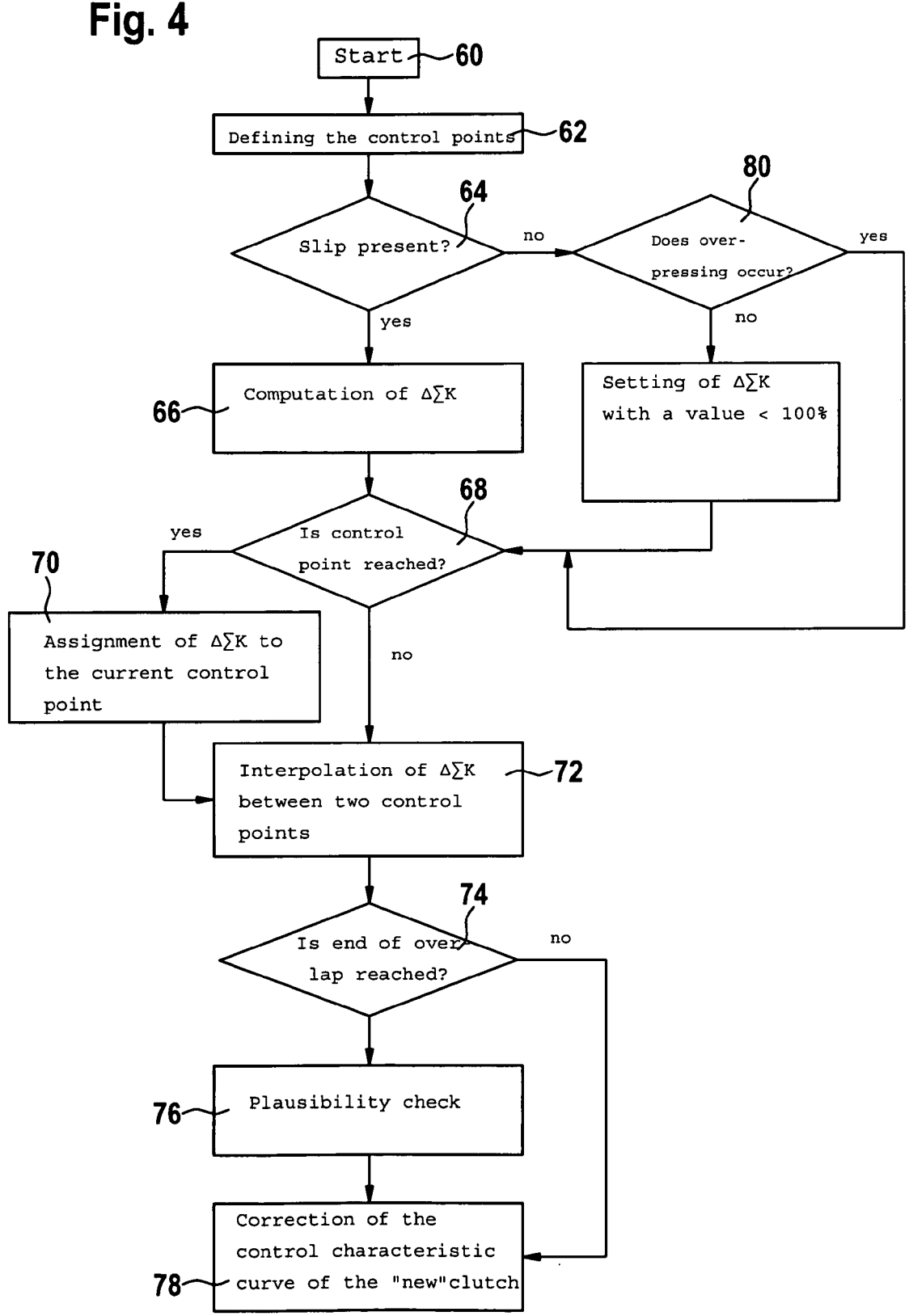
FIG. 4 shows a flow chart for a present invention method.

FIG. 4 shows a flow chart for a present invention method: an adaptation routine begins in step 60, which is, for example, carried out in each shifting process. In step 62, the control points $S_1$ to $S_n$ are defined in the time interval between $T_0$ and $T_1$. In step 64, it is determined whether slip is present on the opening clutch. If this is the case, then in step 66 the overall clutch torque error ΔΣK is computed. This computation takes place with a system frequency that is generally significantly larger than the corresponding distance between two adjacent control points. Step 68, checks whether a control point has been reached. If this is the case, then in step 70 the current overall clutch torque error is assigned to the current control point.

If it is determined in step 68 that no control point is reached, then in step 72, interpolation is done according to the overall clutch torque error measured in the time gap of the timing pulse frequency. When in step 74 the end of the overlapping is determined, i.e. that the time point $T_1$, at which the torque transmission is taken over from the closing clutch, then the steps 70 and 72 in step 76 are deemed plausible, i.e. for instance one checks whether the values assigned to individual control points and interposed points of the clutch are plausible overall errors, for instance, whether they can be connected with a smooth curve. When this is the case, then the stored clutch torques, according to which the clutches are controlled, are updated in step 78, and the control mapping of the closing clutch is updated advantageously and put at disposal for a subsequent shifting process.

When the end of overlapping in step 74 is not determined, correction cannot occur without a plausibility check.

When slip is not detected in step 64 then in step 80 it will be checked whether over-pressing of the opening clutch occurs. If this is the case, then the system goes directly to step 68 without step 66 being executed. When over-pressing is not detected in step 80, then the overall clutch torque error will be set to a value under 100%.

The method described can be changed in multiple ways. For instance, plausibility check in step 76 may be waived, and step 72 can be waived likewise. Since a long period is generally at disposal between two gear shifts, then relative to the time interval between $T_0$ and $T_1$ the recorded values of the entire overall clutch torque error can be processed during a shifting process according to general mathematical method to obtain a plausibly smooth curve, according to which the stored control curve is updated in the electronic control device for a respective, subsequent shifting process.

Figure 5:
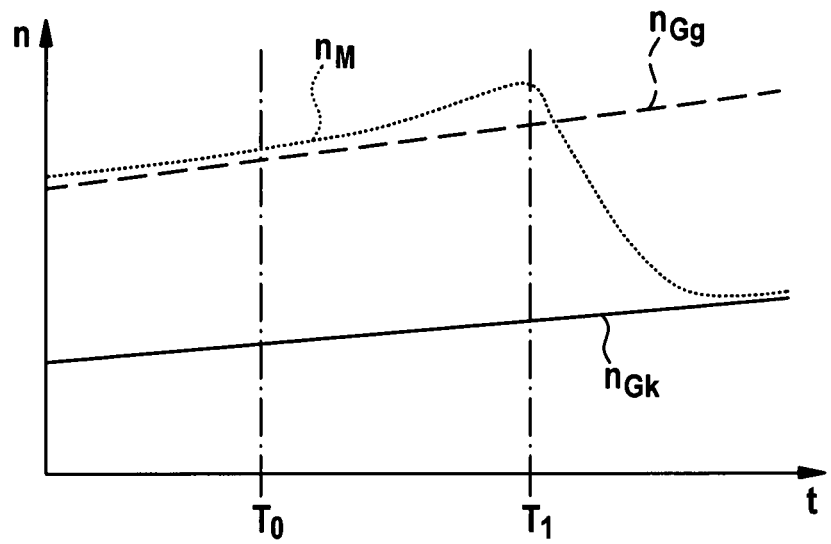
FIG. 5 shows rotational speed curves explaining a further cause of an excessive rotational speed increase of the engine.

FIG. 5 shows the effects of actual values deviating from the planned nominal values of the torques transmitted by the clutches based on engine speed curve. In FIG. 5, rotational speeds are plotted versus time, wherein the curve determining the engine speed is designated with nm, and the curves that determine the rotational speeds of the input shafts of the opening clutch of the transmission and of the closing clutch of the transmission are designated with $n_{Gg}$ and $n_{Gk}$. As is apparent, the rotational speed of the engine rises steeply before the end of the overlapping shifting, in order to decrease the rotational speed of its input shaft through the slip-controlled operation of the closing clutch transmission. The rise of engine speed before the end of overlapping shifting, which is also visible in FIG. 3, is disadvantageous in many different ways. The characteristic curves for the control of clutches during overlapping shifting (between $T_0$ and $T_1$) are in fact designed such that the slip of an opening clutch remains somewhat constant at the value it had prior to the overlapping shifting up to the end of said overlapping shifting.

To avoid excessive rotational speed increase in accordance with FIG. 5, the nominal torque of the closing clutch is determined in correspondence with raw values $M_{Kkroh}$ and an adaptive correction factor $k_{adp}$.

The raw value of the nominal torque for the closing clutch depends on the torque of the opening clutch and the engine torque, or, depends on the torque desired by driver and is defined through the overlap strategy: $M_{Kkrow} = f(M_{KS}; M_{FW})$, where $M_{KS}$ entails the overlap strategy.

For the actual torque that is transmittable by the closing clutch: $M_{kKk} = M_{Kkrow} \times k_{adp}$ The computation and adaptation of the adaptive factor $k_{adp}$ for instance, shows the end of overlap respectively. The currently present slip $n_s(T_1)$ is measured and compared with a target value $ns_{target}$. A typical target value for the slip to the end of overlapping lies between 50 and 100 $min^{-1}$. If the slip is greater, the correction factor is increased, if it is smaller or if the opening clutch closes even up to adhesion during the overlap process, the correction factor is decreased.

To limit the influence of the current operating point on the computation of the adaptive correction factor, a reference torque $M_{ref}$ is computed from the characteristic curve of the torque desired by driver $M_{FW}$ during a shifting process, which, for instance is the mean value of the torque desired by driver during a shifting process.

With the help of this reference value, the adaptive correction factor can be computed anew from the slip at the end of overlap:

$$k_{new} = (\text{ns}(T_1) - \text{ns}_{target}) \cdot \frac{\pi \cdot J_M}{15 \cdot M_{ref} \cdot T_1}, \text{ where } k_{adp} = k_{adpold} \times k_{new}.$$

To be able to initialize adaptation reasonably, the starting value should lie at 1 for the initial system operation. The adaptive correction factor can be limited advantageously to values, for instance, between 0.75 and 1.25.

Figure 6:
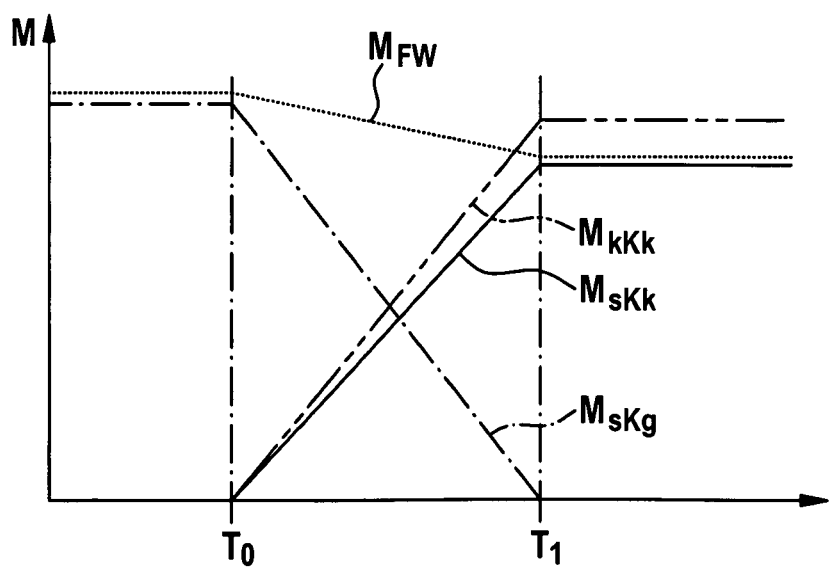
FIG. 6 shows an illustration similar to FIG. 1 for explaining avoidance of excessive rotational speed increase.

FIG. 6 shows the characteristic curve of the controlled characteristic curve $M_{sKk}$ of the closing clutch prior to a shifting process, which leads to excessive torque increase in accordance with FIG. 5. The double dashed line shows corrected characteristic clutch curve with an adaptive factor, which leads to the effect that the rotational speed increase in accordance with FIG. 5 no longer occurs.

Figure 7:
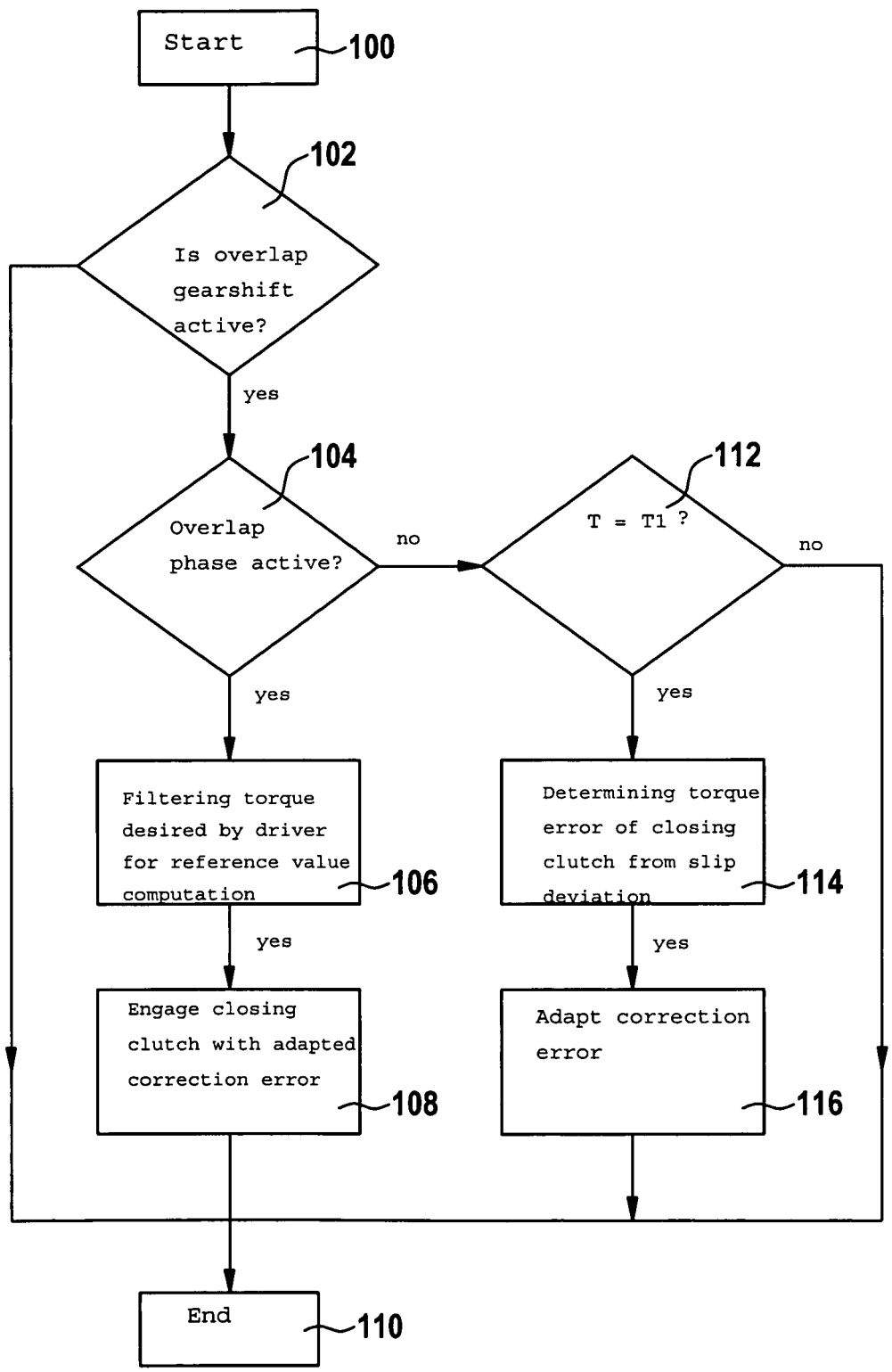
FIG. 7 shows a flow chart for a present invention method.

FIG. 7 shows a flow chart for a present invention method. It is assumed in step 100 that an adaptation cycle, for instance, is triggered by a command for shifting the transmission gears. In step 102, it is verified overlap is active, i.e. whether a command for executing overlapping shifting exists for the purpose of gear change.

If this is the case, in the step 104, it is then checked whether the system is in the overlap phase, i.e. between the time points $T_0$ and $T_1$ in accordance with FIG. 5. Is this the case, then, in step 106 the reference torque for the active shifting process is computed. With the help of the reference torque, the correction factor is adapted in step 108 and the clutch activated accordingly. Finally, the system goes to the end (step 110).

If it is detected in step 102 that no overlapping shifting is active, then the system goes directly to step 110.

If it is detected in step 104 that the overlap phase is not active then in step 112 it is checked whether the system is at the end of overlap phase, i.e. at a time point $T_1$. If this is the case, then in step 114, torque error of the closing clutch is determined from slip deviation at the end of overlapping shifting and in step 116; the correction factor is adapted according to the deviation of slip. The adapted correction factor is then stored and is at disposal for a new shifting process.

If it is found in step 112 that the system is not at the end of overlapping shifting, then it continues directly to step 110.

The system described above can be changed or developed further in multiple ways.

For instance, the computation result for $k_{new}$ can be discarded when the torque desired by driver during a shifting process changes by more that a predetermined value, for instance 30%.

The reference torque can be the torque desired by driver at the end of overlapping shifting, at the beginning of overlapping shifting, a mean value during the overlapping shifting or a different, filtered value derived from the characteristic curve of the torque desired by driver.

For each of the two clutches an individual adaptive correction factor is determined advantageously. The correction factors can be different for partial load, medium load and full-load. Further, a load and gear-dependent characteristic curves of correction factor can be stored.

REFERENCE LIST 10 engine
12 drive shaft
14 split transmission unit
16 split transmission unit
18 shaft
20 differential unit
22 control device

What we claim is:

1. A method of adapting control of clutches of a double clutch transmission, comprising: during a shifting process, controlling torque transmittable by an opening clutch and torque transmittable by a closing clutch according to nominal curves; during a shifting process, determining a difference between a nominal value and an actual value; adapting a nominal curve of at least one of the clutches for a following shifting process by reducing a difference between the nominal value and the actual value; during a shifting process, comparing slip of the opening clutch with a nominal slip; increasing nominal torque of the closing clutch when the slip increases; and, adapting a nominal characteristic curve of the closing clutch corresponding with deviation of slip of the opening clutch at the end of overlapping shifting.

2. The method according to claim 1, wherein a difference between transmittable nominal overall clutch torque and actual overall torque is determined during a shifting process.

3. The method according to claim 2, wherein the transmission is connectable to an engine and the actual overall torque is equal to overall static and dynamic torque input from the engine into the transmission.

4. The method according to claim 3 wherein the engine is part of a vehicle and the static engine torque is a torque desired by a driver of the vehicle and input via an accelerator for the vehicle.

5. The method according to claim 1, further comprising adapting a nominal characteristic curve of the closing clutch corresponding with deviation of slip of the opening clutch at the end of overlapping shifting.

6. The method according to claim 5 wherein the transmission is part of a vehicle and further comprising correcting the nominal characteristic curve of the closing clutch by a factor that depends on the torque desired by a driver of the vehicle, input by means of an accelerator for the vehicle, and adapted to the slip at the end of overlapping shifting.

7. A device for adapting the control of clutches of a double clutch transmission, the double clutch transmission comprising clutches (K1, K2), a respective actuator for each of clutches (K1, K2), and an electronic control device (22) for controlling the opening of one of the clutches and, at the same time, for closing the other clutch during an overlapping shifting phase, wherein the control device is suitable for controlling the clutches according to the method in claim 1.

8. A method of adapting control of clutches of a double clutch transmission, comprising:
during a shifting process, controlling torque transmittable by a first clutch that is opening and torque transmittable by a second clutch that is closing according to respective nominal curves;
during the shifting process, determining a difference between a nominal value in a respective nominal curve for the first or second clutch and an actual value related to operation of the first or second clutch;
during a shifting process, comparing slip of the first clutch with a nominal slip;
increasing nominal torque of the second clutch when the slip increases;
modifying the respective nominal curve by changing the nominal value to reduce a magnitude of the difference between the nominal value and the actual value; and,
adapting a nominal characteristic curve of the second clutch corresponding with deviation of slip of the first clutch at the end of overlapping shifting, wherein:

the transmission is connectable to an engine;

actual overall torque is equal to overall static and dynamic torque input from the engine into the transmission; and, the engine is part of a vehicle and the static engine torque is a torque desired by a driver of the vehicle and input via an accelerator for the vehicle.

9. A method of adapting control of clutches of a double clutch transmission, comprising:

during a shifting process, controlling torque transmittable by a first clutch that is opening and torque transmittable by a second clutch that is closing according to respective nominal torque curves;

during the shifting process, determining a difference between a nominal torque value in a respective nominal torque curve for the first or second clutch and an actual torque value related to operation of the first or second clutch;

during a shifting process, comparing slip of the opening clutch with a nominal slip;

increasing nominal torque of the closing clutch when the slip increases;

modifying the respective nominal torque curve by changing the nominal torque value to reduce a magnitude of the difference between the nominal torque value and the actual torque value;

adapting a nominal characteristic curve of the closing clutch corresponding with deviation of slip of the opening clutch at the end of overlapping shifting; and, correcting the nominal characteristic curve of the closing clutch by a factor that depends on the torque desired by a driver of the vehicle, input by means of an accelerator for the vehicle, and adapted to the slip at the end of overlapping shifting, wherein the transmission is part of a vehicle.

* * * * *